Nov. 11, 1958  H. W. KISSINGER  2,859,712
DOUGH-MOLDING MACHINE
Filed March 21, 1956
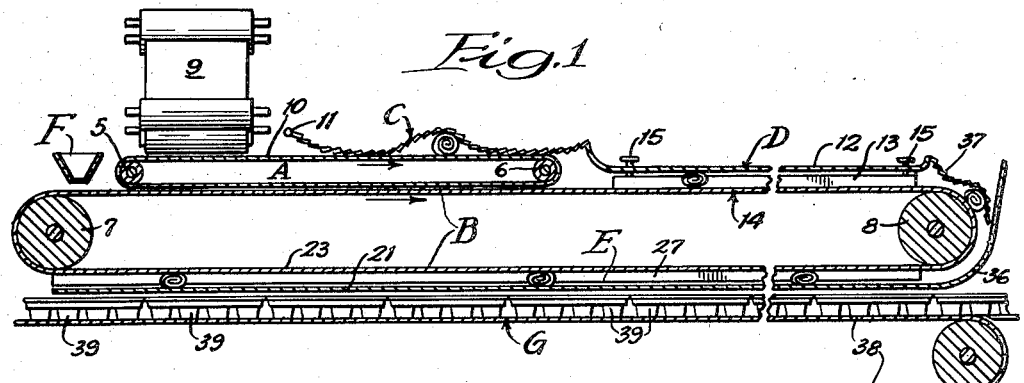
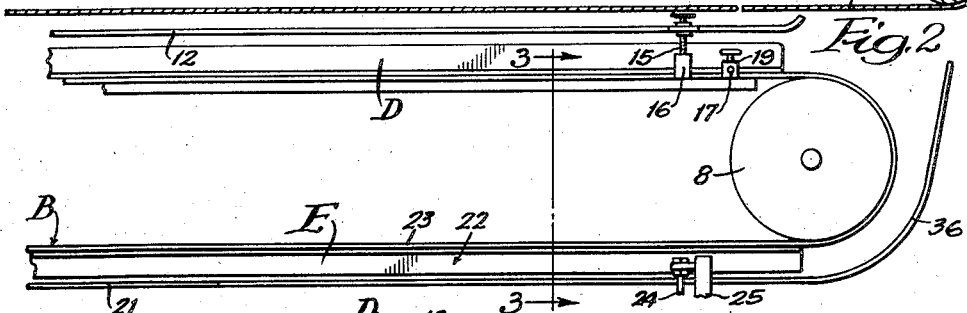
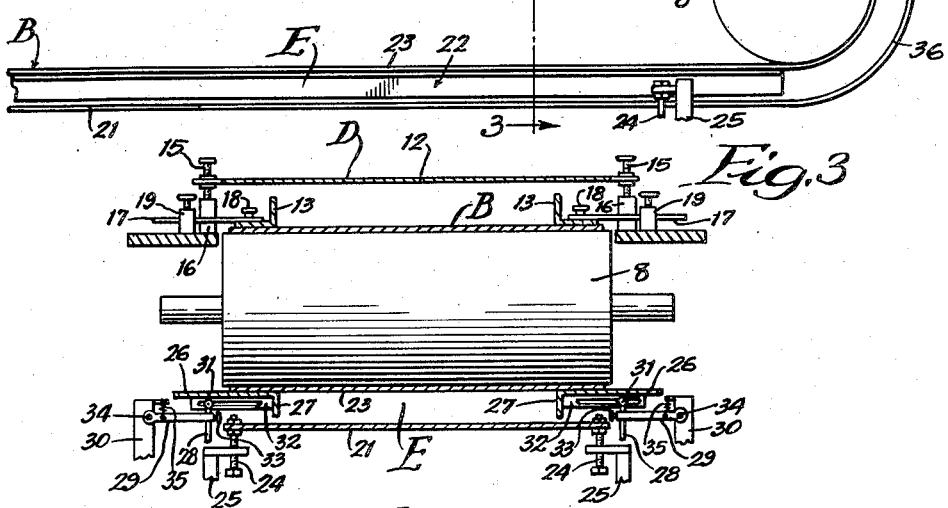
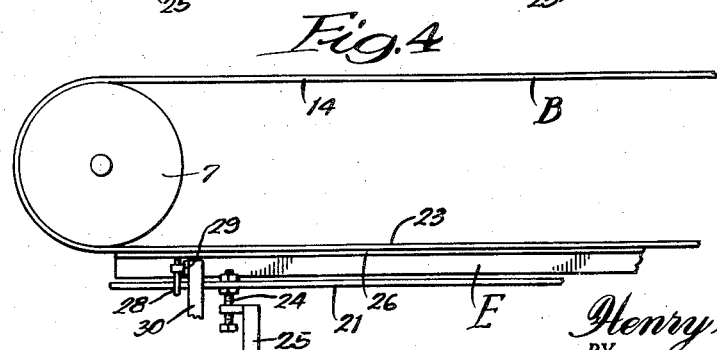
INVENTOR:
Henry W. Kissinger,
BY
ATTORNEY.

United States Patent Office 2,859,712
Patented Nov. 11, 1958

2,859,712

DOUGH-MOLDING MACHINE

Henry W. Kissinger, Chicago, Ill.

Application March 21, 1956, Serial No. 572,940

3 Claims. (Cl. 107—9)

This invention relates to machines for converting dough into rolls for baking into loaves of bread.

There are three conventional sequential operations in preparing dough for baking bread. First, sheeting scaled, rounded, and proofed dough pieces; second, curling the sheeted dough pieces into rolls; and third, molding the curled dough pieces to proper length and firmness for deposit into baking pans.

The sheeting is effected by one or more pairs of rollers which convert the scaled, rounded, and proofed dough pieces into flat and somewhat round sheets and delivers them to the top run of a conveyor belt. The curling is effected by a flexible element positioned to drag on the upper face of the conveyor belt and so contact the sheeted dough pieces as to curl them into rolls as they are carried along by the conveyor belt. The molding of the curled dough pieces is effected between adjustable end guide members and a pressure plate arranged longitudinally of the conveyor belt beyond the curling element and adjacent the end of the conveyor belt from which the curled dough pieces are discharged for consequent placing in baking pans.

The universal practice is to arrange the curling element and the molding means successively along the top run of a single conveyor belt.

The main objects of this invention are to provide a dough-molding machine having an improved form and relative arrangement of the dough-piece curling element and the dough-piece molding means; to provide a dough-molding machine having an improved form and arrangement of end guide members and coacting pressure plate along the under side of a conveyor belt; to provide an improved dough-molding machine of this kind which affords a longer molding section in very much less floor space than is required for conventional machines; and to provide a dough-molding machine having an improved arrangement of the dough-piece curling element and the dough-piece end guides and pressure plate which permit dusting the dough after curling rather than before.

In the adaptation shown in the accompanying drawings:

Fig. 1 is a schematic view of a dough-molding machine having the improved dough-piece curling and molding means constructed in accordance with this invention;

Fig. 2 is an enlarged, fragmentary view of one end of the machine schematically illustrated in Fig. 1;

Fig. 3 is a transverse view taken on the plane of the line 3—3 of Fig. 2; and

Fig. 4 is a view similar to that of Fig. 2 but of the opposite end of the machine.

The essential concept of this invention involves separate, superimposed conveyor belts having respectively associated therewith a flexible curling element along the upper run of one belt and end guide members and a pressure plate arranged along the under run of the other belt as the primary means for molding the curled dough pieces.

A dough-molding machine embodying the foregoing concept comprises a pair of superimposed conveyor belts A and B, the former having arranged thereon a conventional-type curling element C and the latter having associated therewith the conventional and auxiliary dough-molding means D; a primary molding means E, and a flour duster F, wherewith is associated an automatic panner G.

The belts A and B are the conventional type generally employed in dough-molding machines for the baking industry. In this particular embodiment the belt A, in coaction with the element C, effects the curling of the sheeted dough pieces into dough rolls, whereas the belt B, in coaction with the molding means D and E, firms and extends the curled dough pieces preparatory to their being placed in pans for baking.

As clearly indicated in the drawings, these two belts travel between and around pairs of spaced pulleys 5 and 6 and 7 and 8 respectively. The pulleys are so journaled, by conventional means, on a supporting frame as to dispose the two belts A and B in closely-spaced, superimposed, parallel relationship. The pulleys 5 and 6 are positioned intermediate the pulleys 7 and 8, longitudinally of the supporting framework, with the pulley 5 a short distance inwardly from the pulley 7 and the pulley 6 inwardly of the pulley 8 depending upon how much molding of the curled dough pieces is desired by the conventional dough-molding means E before being transferred to the under-belt primary dough-molding means E. Thus the belt A over-rides only a portion of the belt B. As here shown, the pulleys 5 and 6 are smaller in diameter than the pulleys 7 and 8. However, neither that fact nor their relative proportions are imperative conditions.

Dough-sheeting mechanism 9 of a conventional character, is arranged adjacent the trailing end of the conveyor belt A to deliver sheeted dough pieces onto the upper face of the upper run 10 of the belt A.

The sheeted dough-piece curling element C is a strip of flexible material anchored at 11 above the belt A so that the main part of the element drags on the top face of the upper run 10 of the belt A. Such a curling element C is quite generally made of chain mesh. Its fastening is above the belt C adjacent the point at which the sheeted dough pieces are delivered to the belt A, by the dough-sheeting mechanism, and extends along the remainder of the belt near to or at the pulley 6, where the curled dough pieces are discharged to the belt B for passage through the auxiliary molding means D.

This auxiliary molding means D comprises a conventional pressure plate 12 and a pair of coacting end guide members 13 arranged below the pressure plate 12 and spanning the length of the upper run 14 of the belt B between the pulley 6 of the upper belt A and at or near the pulley 8 of the lower belt B.

The pressure plate 12 is supported by nuts on front and rear pairs of screws 15 threaded into posts 16 arranged on the supporting frame at the sides of the belt B. Turning the screws 15, and/or the respective nuts, permits spacing the pressure plate 12 from the upper run 14 of the belt B and inclining it to the belt B to secure the desired results in the forming of the curled dough pieces as the belt B pulls them along the guide members 13.

The end guide members 13 here are shown in the form of angle bars. They are swiveled to arms 17 by screws 18 which in turn are adjustably supported in posts 19 secured to the supporting frame. The members 13, so mounted, ride on the upper run 14 of the belt B and may be spaced apart transversely of the belt B to accomplish two results: (1) limit the length of the curled dough pieces as they move along the guide members 13, and (2) determine the exact point of discharge of the dough pieces from the end of the upper run 14 of the belt B.

Although it is not imperative that it be so done, Fig. 1 shows the advance end of the curling element C connected to the upturned end 20 of the pressure plate 12.

The primary molding means E, like the auxiliary molding means D, comprises a more or less conventional pressure plate 21 and a pair of coacting end guide members 22 arranged along the under run 23 of the lower belt B.

The pressure plate 21 is supported on front and rear pairs of adjusting screws 24 threaded through brackets 25 arranged on the supporting frame at the sides of and below the belt B. Turning the screws 24 permits the spacing and inclination of the pressure plate 21 along the under run of the lower belt B so as to secure the desired results in firming the curled dough pieces as they are pulled along the plate 21 and the guide members 22 by the under run 23 of the belt B.

These under-belt end guide members 22, like the above-belt end guide members 13, here are shown of angle bar form, however, with the one leg 26 much longer than the other leg 27.

As with the end guide members 13, on the upper run 14 of the belt B, so with these guide members 22, it is imperative that they be held in constant contact with the face of the lower run of the belt B. To the attainment of that end, each end guide member 22 is adjustably supported on a rod 28 in turn adjustably supported in a spring-biased arm 29 hinged to frame-mounted posts 30.

By means of a threaded pin 31, each of the respective rods 28 is secured at its upper end to a slotted flange 32 on the under side of the leg 26 of the respective end guide member 22. Each such rod 28 extends through the apertured end of the arm 29, to which it is adjustably retained in place by a set screw 33. Each arm 29 is hinged at 34 and actuated by a spring 35 to press the face of the leg 26, of the respective end guide member 22, against the face of the under run 23 of the lower belt B, as is so clearly shown in Fig. 3.

With this primary dough-molding means E, it is most imperative that the pairs of end guide members 22 be held constantly and firmly in contact with the face of the run 23 of the belt B, quite as is the case with the end guide member 13 of the auxiliary molding means D. This insures two results: First; the firming of the curled dough pieces to precisely the desired uniform length to accommodate the pans into which the rolls are to be transferred for baking. Secondly; the discharge of the curled dough pieces successively at precisely the right point for positioning in the pans when an automatic panning mechanism G is used.

As for the first of these above requisites, if, with either of these molding means, there were any gap between the guide members 13 and 22 and the respective faces of the belt, the curled dough pieces, as they are pulled along the guide members, would be forced out through these gaps. This would result in not only the loss of the dough which would thus be extruded out through those gaps, but the loaf, when baked, would not meet standard requirements for weight.

In addition to the imperativeness of the end guide members being held firmly in contact with the respective runs of the belt B, it also is imperative that there be some space between the outer lateral edges of the members and the opposed face of the respective pressure plates 12 and 21. Such a space permits venting the gases from the pockets formed during the manipulation of the dough pieces up to this point. Were no such gas escape provided for, pockets would be formed in the baked loaf.

As the break in Figs. 1 and 2 indicates, the overall length of the belt B and the two molding means D and E is intended to be indeterminate. Whatever, in any embodiment of this invention, may be the length of the belt B, the final molding of the curled dough pieces is effected by the primary molding means E. This molding means extends the full dimension of the under run of the belt B, whatever that length may be. Thus by this primary molding means the molding of the curled dough pieces is effected for twice the extent possible where the molding has to be confined to means associated with the run of the belt.

Such being the case, the conventional upper molding means D is subordinate or incidental to the molding effected by the under belt molding means E. For that reason, the length of the upper or auxiliary dough molding means D may be very short; in fact only enough to effectively transfer the curled dough pieces from the discharge end of the curling element C to the under belt primary molding means E.

This permits the forming of a very compact molding machine, reduced in cost and requiring much less space than the conventional machines currently in use. Thus the smaller bakeries, where floor space and finances are limited, will be enabled, with this type of machine, to effectively compete with the larger bakeries.

On the other hand, when there are requirements for a more extended period of dough molding than the conventional machine permits, the use of this under-belt molding means will triple the period of time afforded for molding.

In order to facilitate the transfer of curled dough pieces from the above-belt molding means D to the under-belt molding means E, the pressure plate 21 has an extension 36 formed at one end concentrically disposed partially around the belt B on the pulley 8 and flared outwardly a short distance above the horizontal center line of the pulley. This provides a sort of chute to the molding means E adjacent the point of discharge of the curled dough pieces from the molding means D. To further facilitate the transfer of the curled dough pieces from the one molding means to the other, without any likelihood of any relaxing of the coils of the curled dough pieces, an auxiliary curling element 37 here is shown attached to the discharge end of the pressure plate 12 to drag around the belt B on the pulley 8.

The use of the two belts A and B, arranged as herein-shown and explained, permits a placing of a conventional-type flour duster F at the trailing end of the upper run 10 of the belt B—just in advance of the belt A. Such an arrangement confines flour dusting to the exterior of the curled dough pieces, for reducing their tackiness as they move through the molding means D and E. This is a material advantage over the dusting heretofore always done on the belt on which sheeted dough pieces are curled. In this latter instance, excess quantities of flour, not absorbed by the moist dough pieces, creates undesirable flour lumps in the baked loaf of bread. Confining the dusting to the exterior of the curled dough pieces completely obviates the likelihood of these undesirable flour pockets in a baked loaf.

An automatic panner G is diagrammatically illustrated as associated with the foregoing mechanism. As Fig. 1 indicates, such a panner includes a conveyor 38, disposed along the under run 23 of the belt B, to which pans 39, in groups of 4, are delivered on one end to be moved along the pressure plate 21 to the opposite end adjacent the pulley 7, where the completely-formed dough pieces are to be discharged.

Control and trip means, of a conventional type, constitute a part of the panner G for effecting a step-by-step advance of the pans as each dough piece is discharged from the delivery end of the molding means E.

When an automatic panner is used with this improved under belt molding means E, another advantage accrues over the conventional-type molding machine, in that the space through which the completely-formed dough pieces have to drop into the pans is materially lessened. With the underbelt molding means E the drop is straight down, short, and quick. In the conventional molding machine the curled dough pieces, leaving the pressure plate, have to travel at least a quarter way around the pulley 8 and drop a further distance into the pan.

The operation of the hereinshown dough molding machine is believed to be quite apparent from the foregoing explanation. It need only be noted that sheeted dough pieces from the sheeting means 9 are delivered to the top run 10 of the belt A, move along under the curling element C and drop onto the upper run 14 of the belt B. It is at this point that the curled dough piece has its contact with dusting flour, the dusting being confined to the exterior surface of the rolls. The rolls move on through the molding means D, are discharged under the auxiliary curling element 37 and received into the extension 36 and thereby guided into the primary molding means E. Thereupon the curled dough pieces move through their primary molding means E and are discharged at the opposite end into the waiting pans 39.

Variations and modifications in the details of structure and arrangement of the parts may be restorted to within the spirit and coverage of the appended claims.

I claim:

1. A dough-molding machine comprising, a supporting frame, a conveyor belt traveling between and around horizontally-spaced pulleys with the upper and lower runs of the belt free of support between the pulleys, the pulleys being journaled on the frame on axes fixed against movement relative to each other except for the purpose of tensioning the belt, a pressure plate positioned on the frame in longitudinally-juxtaposed relationship to the under run of the belt and independently adjustable to maintain dough rolls in predetermined contact with the under run of the belt, transversely-spaced guide members interposed between the pressure plate and the under run of the belt in contact with the belt, and means yieldingly maintaining the respective members in contact with the face of the under run of the belt for limiting the extension of the dough rolls traversing the plate.

2. A dough-molding machine comprising, a supporting frame, a conveyor belt traveling between and around horizontally-spaced pulleys with the upper and lower runs of the belt free of support between the pulleys, the pulleys being journaled on the frame on axes fixed against movement relative to each other except for the purpose of tensioning the belt, an upper pressure plate positioned on the frame in longitudinally-spaced relationship to the upper run of the belt to maintain dough rolls in predetermined contact with the upper run of the belt, a lower pressure plate positioned on the frame in longitudinally- juxtaposed relationship to the under run of the belt to maintain dough roll in predetermined contact with the under run of the belt, transversely-spaced guide members interposed between each pressure plate and the respective runs of the belt in contact with the respective runs, means for yieldingly maintaining each guide member in contact with the face of the respective runs of the belt for limiting the extension of the dough rolls traversing the respective pressure plates, means for conveying dough rolls discharged from between the upper pressure plate and respective run of belt to an entrance between the lower pressure plate and the respective run of belt, and means for independently adjusting the position of each pressure plate with respect to the respective runs of the belt.

3. A dough-molding machine comprising, a supporting frame, a conveyor belt traveling between and around horizontally-spaced pulleys, the pulleys being journaled on the frame on fixed axes against movement relative to each other except for the purpose of tensioning the belt, a one-piece pressure plate positioned on the frame in coextensive substantial parallel relationship with the under run of the belt, the plate having a plain continuous upper surface opposed to the face of the under run of the belt, means for adjusting the plate vertically toward and away from the belt to predetermine the contact of the dough rolls with the belt, a pair of flat guide members substantially coextensive with the plate and each flanged along one edge the members being positioned on the frame between the belt and the plate in contact with the belt and with the flanges in horizontally-spaced parallel opposition to each other normal to the plane of the belt, means for shifting each member vertically to maintain contact thereof with the face of the under run of the belt, and other means for shifting the members horizontally toward and away from each other to adjust the distance between the opposed flanges in a plane parallel to the belt intermediate the belt and plate.

References Cited in the file of this patent

UNITED STATES PATENTS

| 1,657,018 | Larraburu | Jan. 24, 1928 |
| 1,658,864 | Sternberg | Feb. 14, 1928 |
| 1,781,546 | Harber | Nov. 11, 1930 |
| 1,816,844 | Harber | Aug. 4, 1931 |
| 2,725,019 | Austin | Nov. 29, 1955 |

FOREIGN PATENTS

| 494,023 | Belgium | June 16, 1950 |